(12) United States Patent
Aquino

(10) Patent No.: US 10,827,811 B2
(45) Date of Patent: Nov. 10, 2020

(54) PORTABLE UNIVERSAL FLAT MULTIPLE ALL-IN-ONE TOOL AND HOLDER

(71) Applicant: Rojoeyl Aquino, East Elmhurst, NY (US)

(72) Inventor: Rojoeyl Aquino, East Elmhurst, NY (US)

(73) Assignee: Rojoeyl Aquino, East Elmhurst, NY (US)

( * ) Notice: Subject to any disclaimer, the term of this patent is extended or adjusted under 35 U.S.C. 154(b) by 318 days.

(21) Appl. No.: 15/850,761

(22) Filed: Dec. 21, 2017

(65) Prior Publication Data

US 2019/0191839 A1  Jun. 27, 2019

(51) Int. Cl.
| | |
|---|---|
| *A45C 11/24* | (2006.01) |
| *A45C 13/02* | (2006.01) |
| *F16B 35/00* | (2006.01) |
| *A45C 13/00* | (2006.01) |
| *B25H 3/02* | (2006.01) |
| *B25H 3/00* | (2006.01) |

(52) U.S. Cl.
CPC ............ *A45C 11/24* (2013.01); *A45C 13/008* (2013.01); *A45C 13/02* (2013.01); *B25H 3/003* (2013.01); *B25H 3/02* (2013.01); *F16B 35/005* (2013.01); *A45F 2200/0575* (2013.01)

(58) Field of Classification Search
CPC .... B65D 69/00; B65D 85/28; B65D 73/0042; A45C 11/00; A24F 27/00; B25F 1/04; B25H 3/003; B26B 11/008; F21V 33/0084
See application file for complete search history.

(56) References Cited

U.S. PATENT DOCUMENTS

| | | | | |
|---|---|---|---|---|
| 4,100,661 | A * | 7/1978 | Cheak ................. | B27M 3/0006 144/27 |
| 6,009,584 | A * | 1/2000 | Padden ................. | A46B 7/023 15/201 |
| 6,062,111 | A * | 5/2000 | Wershe .................. | B25B 13/56 81/177.2 |
| 6,145,994 | A * | 11/2000 | Ng ........................... | B25F 1/02 206/234 |
| 6,460,698 | B1 * | 10/2002 | Wang ....................... | B25F 1/02 206/234 |
| 7,854,318 | B2 * | 12/2010 | Chen ...................... | B25H 3/003 206/234 |

(Continued)

*Primary Examiner* — J. Gregory Pickett
*Assistant Examiner* — Tia Cox

(57) ABSTRACT

The present disclosure relates generally to utensil holders, and more particularly, the present disclosure relates to such holders that are flat card-like all-in-one tool and holder. The present disclosure provides a robust, durable, waterproof flat all-in-one tool and holder having not only compartments for a number of removable or deployable tools such as but not limited to a Phillips Power/Driving Bits, Hex Power/Driving Bits, Torx Power/Driving Bits, Slotted Power/Driving Bits, and Flathead Power/Driving Bits or the like, but also one or more edges is carved to have at least a box cutter, a string cutter, a bottle opener, a wingnut tool, a plurality of metric wrench set of different sizes, a paint can opener, a threaded locking screw, a wire striper, a plurality of Spoke wrenches (SW) of different sizes, and Swiss T-20 Torn nipple wrench and a Hex Bits socket, and at least a file tool.

13 Claims, 8 Drawing Sheets

(56) References Cited

U.S. PATENT DOCUMENTS

| | | | | |
|---|---|---|---|---|
| 8,083,060 | B1* | 12/2011 | Liu | B25H 3/003 |
| | | | | 206/379 |
| 8,613,121 | B1* | 12/2013 | White | B26B 11/00 |
| | | | | 7/119 |
| 9,572,437 | B1* | 2/2017 | Ou | A47F 7/024 |
| 2009/0060664 | A1* | 3/2009 | Bean | B23B 29/14 |
| | | | | 407/102 |
| 2010/0147710 | A1* | 6/2010 | Lebauer | A45C 11/008 |
| | | | | 206/234 |
| 2012/0205271 | A1* | 8/2012 | Sun | G02C 13/001 |
| | | | | 206/373 |
| 2014/0143958 | A1* | 5/2014 | Barr | B25F 1/00 |
| | | | | 7/138 |
| 2016/0288972 | A1* | 10/2016 | Kirkham | B65D 73/0035 |
| 2017/0025102 | A1* | 1/2017 | Brown, Jr. | G10H 3/18 |

* cited by examiner

PORTABLE UNIVERSAL FLAT MULTIPLE ALL-IN-ONE TOOL AND HOLDER

FIELD OF THE INVENTION

The present disclosure relates generally to all-in-one tool and holders, and more particularly, the present disclosure relates to such all-in-one tool and holder that are flat card-like all-in-one tool and holder.

BACKGROUND

The background description includes information that may be useful in understanding present invention. It is not an admission that any of the information provided herein is prior art or relevant to the presently claimed invention, or that any publication specifically or implicitly referenced is prior art.

Many people desire to carry a number of different utensils or tools, such as a knife, bottle opener, nail file, screw driver, mirror, toothpick and tweezers, in a pocket or handbag. However, these tools typically have rough surfaces, sharp edges or pointed tips. Thus, the user must be protected from injury due to inadvertent or accidental contact with these tools when reaching into the pocket or handbag.

A number of different holder devices which contain these different commonly-used tools have been proposed in the prior patent art. Representative examples of these tool holder devices are the ones disclosed in U.S. patents to Fink (973,930), Benson (U.S. Pat. No. 1,590,492) and Mosch (U.S. Pat. Nos. 2,412,056 and 2,630,212). U.S. Pat. No. 5,328,026 to Newman, the present Applicant, discloses a flat multiple tool holder that is useful to releasably hold a number of tools in a thin flat carrier. Outer surfaces of the holder may be used for printing logo, advertising material and other information. However, a common drawback of these devices is that they have heavy, complicated and expensive constructions.

Consequently, a need still exists for a multiple tool holder which is simple in construction and small in size and avoids the drawback of the prior an.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

SUMMARY

The present disclosure relates generally to all-in-one tool and holders, and more particularly, the present disclosure relates to such all-in-one tools and holder that are flat card-like all-in-one tool and holders.

An object of the invention is to provide a robust, durable, waterproof flat all-in-one tool and holder having not only compartments for a number of removable or deployable tools such as but not limited to a Phillips Power/Driving Bits, Hex Power/Driving Bits, Torx Power/Driving Bits, Slotted Power/Driving Bits, and Flathead Power/Driving Bits or the like, but also one or more edges is carved to have at least a box cutter, a string cutter, a bottle opener, a wingnut tool, a plurality of metric wrench set of different sizes, a paint can opener, a threaded locking screw, a wire striper, a plurality of Spoke wrenches (SW) of different sizes and Swiss T-20 Torn nipple wrench, and a Hex Bits socket, and at least a file tool. These and other objects are attained by a combination tool as described below.

The present invention provides a flat all-in-one tool and holder all-in-one tool and holder designed to satisfy the aforementioned need. The flat all-in-one tool and holder of the present invention has the configuration of a credit card which conveniently fits into a user's pocket, purse, or wallet, occupying only minimal space and stores multiple everyday or commonly-used tools in an organized fashion. People are accustomed to carrying credit cards, so configuring the all-in-one tool and holder of the present invention to resemble a credit card will attract user interest. Further, the construction of the all-in-one tool and holder is very simple making the all-in-one tool and holder very inexpensive to manufacture.

The invention provides all in one multi-tool functionality integrated into a wallet. The wallet allows users to incorporate various sets of tools, implements, and attachments in a portable, compact, and waterproof case.

An aspect of the present disclosure relates to a flat all-in-one tool and holder all-in-one tool and holder having a flat card-like body with an interior and a plurality of end edges. The flat card-like body encloses a plurality of separate channels in the interior, wherein the channels being shaped to match a profile of a given one of a plurality of different tools to be held in the channels of the body. The detachable edge of the plurality of end edges is detachable to allow removal of the plurality of different tools from an open end upon detachment, and one or more edges from the plurality of end edges are carved with at least one mechanical tool.

In an aspect, the plurality of separate channels in the interior provides an additional support to prevent the flat card-like body from bending and/or splitting into parts.

In an aspect, the flat all-in-one tool and holder includes a locking mechanism to protect the plurality of different tools to fall-through. In another aspect, locking mechanism is a threaded locking screw.

In an aspect, the threaded locking screw goes through the threaded hole 137 to affirm good locking. In an aspect, the threaded locking screw can be a magnetic screw. In an exemplary implementation, the magnetic screw prevents itself from falling or misplacing or from losing when the tool is in open position or in operating state.

In an aspect, the plurality of different tools comprises any or combination of a Phillips Power/Driving Bits, Hex Power/Driving Bits, Torx Power/Driving Bits. Slotted Power/Driving Bits, and Flathead Power/Driving Bits. In another aspect, the plurality of different tools comprises screw bit holder having an embedded magnet and carved with one or more wire benders of different sizes.

In an aspect, each of the separate channels 101 being open at one of the end edges of the body upon detachment of the detachable edge.

In an aspect, a first edge of the one or more edges is carved to have at least a box cutter, a string cutter, a bottle opener, a wingnut tool, a plurality of metric wrench set of different sizes and a paint can opener.

In an aspect, a second edge of the one or more edges is carved to have at least a threaded locking screw, a wire striper, a plurality of Spoke wrenches (SW) of different sizes and Swiss T-20 Torn nipple wrench, and a Hex Bits socket.

In an aspect, a third edge of the one or more edges is carved to have at least a file tool.

In an aspect, a fourth edge of the one or more edges is opposite to the detachable edge of the plurality of end edges, wherein the fourth edge is carved to have a flat surface as a restriction to the plurality of different tools allowing removal of the plurality of different tools from the open end upon detachment of the detachable edge.

In an aspect, the flat all-in-one tool and holder includes a cover to envelop first edge of said one or more edges thereby covering sharp edges of at least a box cutter, a string cutter, a bottle opener, a wingnut tool, a plurality of metric wrench set of different sizes and a paint can open. In another aspect, the at least a box cutter, a string cutter, a bottle opener, a wingnut tool, a plurality of metric wrench set of different sizes and a paint can opener are accessible only in open position of the cover.

In an aspect, the cover is manufactured from any or combination of a rubber, a plastic and any flexible material. In another aspect, the cover further comprises one or more holes to allow use with carabiner for hanging of said cover with tool on pockets, belts and bags.

In an aspect, the cover provides protection from the sharp edges of the tool and also utilized for locking the tool.

These and other features and advantages of the present invention will become apparent to those skilled in the art upon a reading of the following detailed description when taken in conjunction with the drawings wherein there is shown and described an illustrative embodiment of the invention.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure, and wherein.

DETAILED DESCRIPTION OF THE INVENTION

Figure 1:
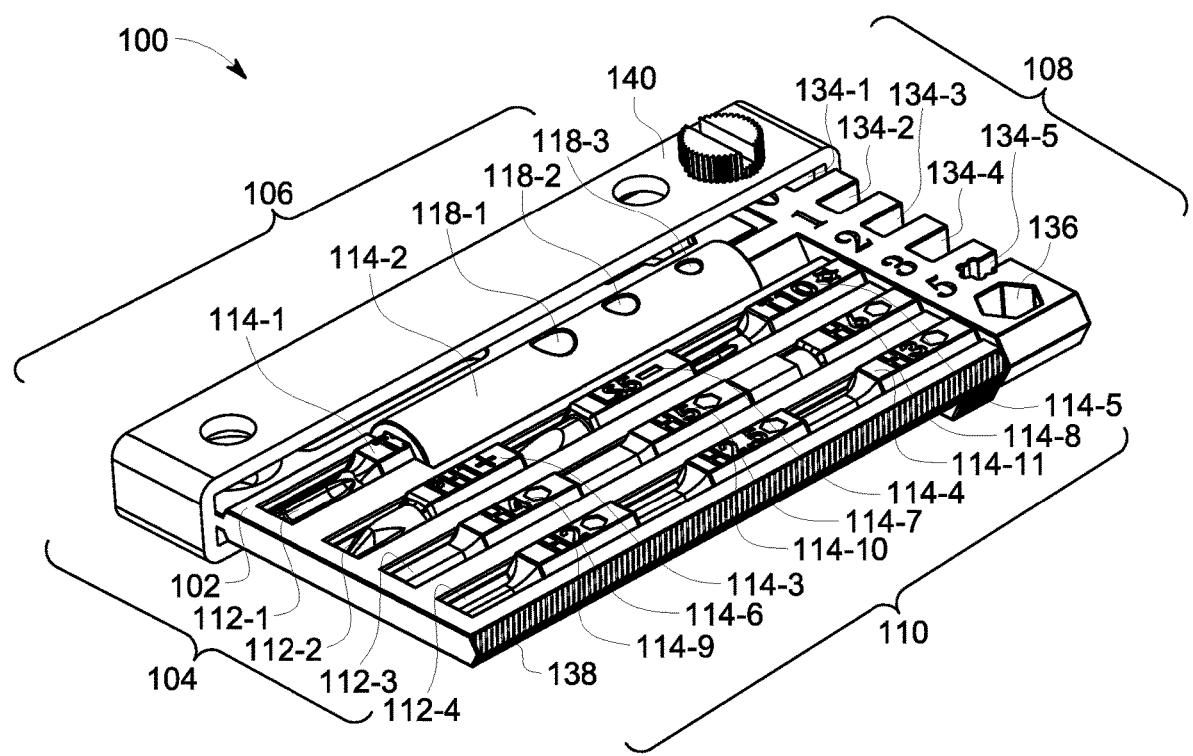
FIG. 1-2 illustrates a proposed flat all-in-one tool and holder with cover, in accordance with an exemplary embodiment of the present disclosure

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms as used herein are shown below. To the extent a term used in a claim is not defined below, it should be given the broadest definition persons in the pertinent art have given that term as reflected in printed publications and issued patents at the time of filing.

The present disclosure relates generally to utensil holders, and more particularly, the present disclosure relates to such holders that are flat card-like all-in-one tool and holder.

Figure 2:
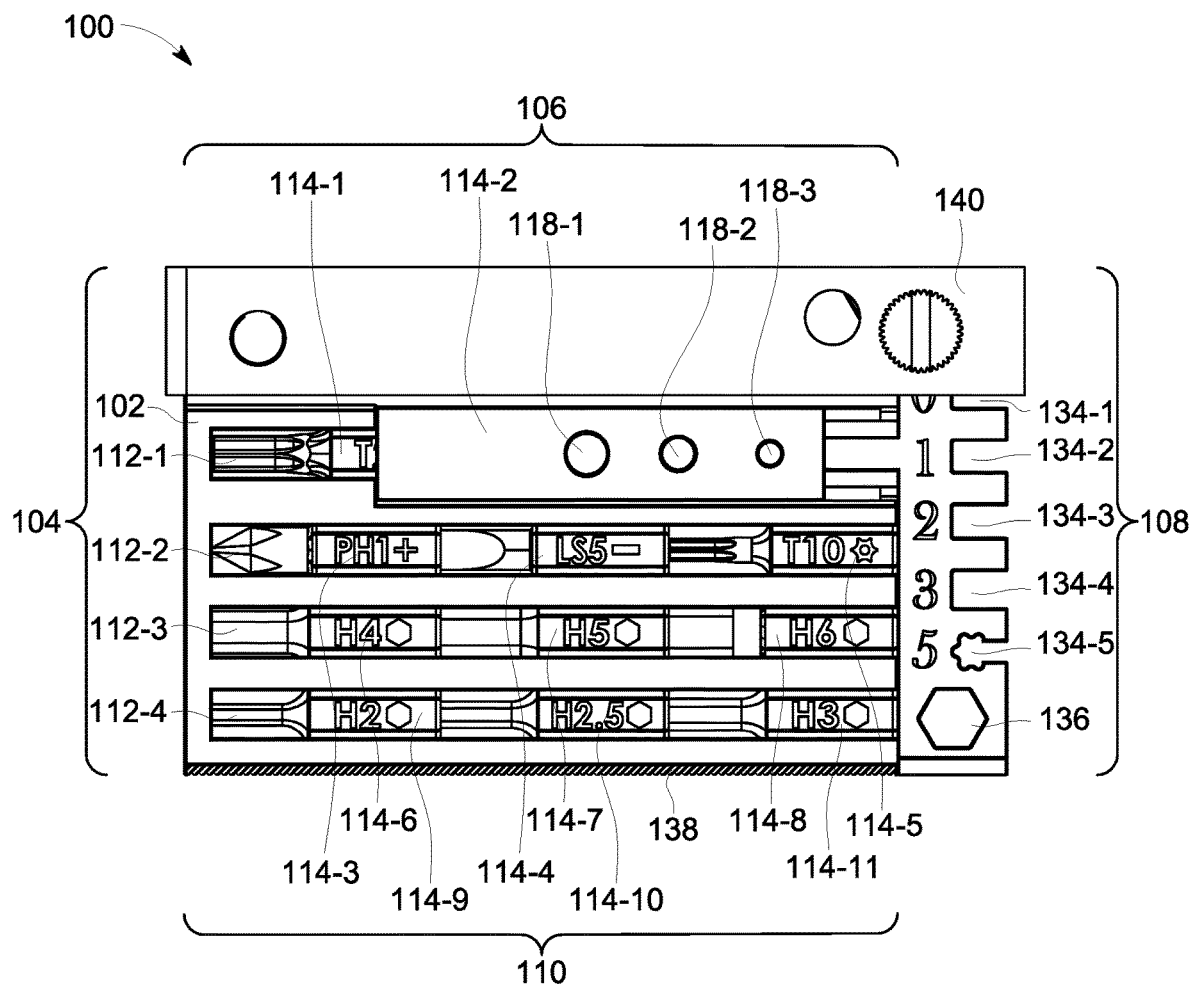

FIG. 1-2 illustrates a proposed flat all-in-one tool and holder with cover, in accordance with an exemplary embodiment of the present disclosure.

Figure 3:
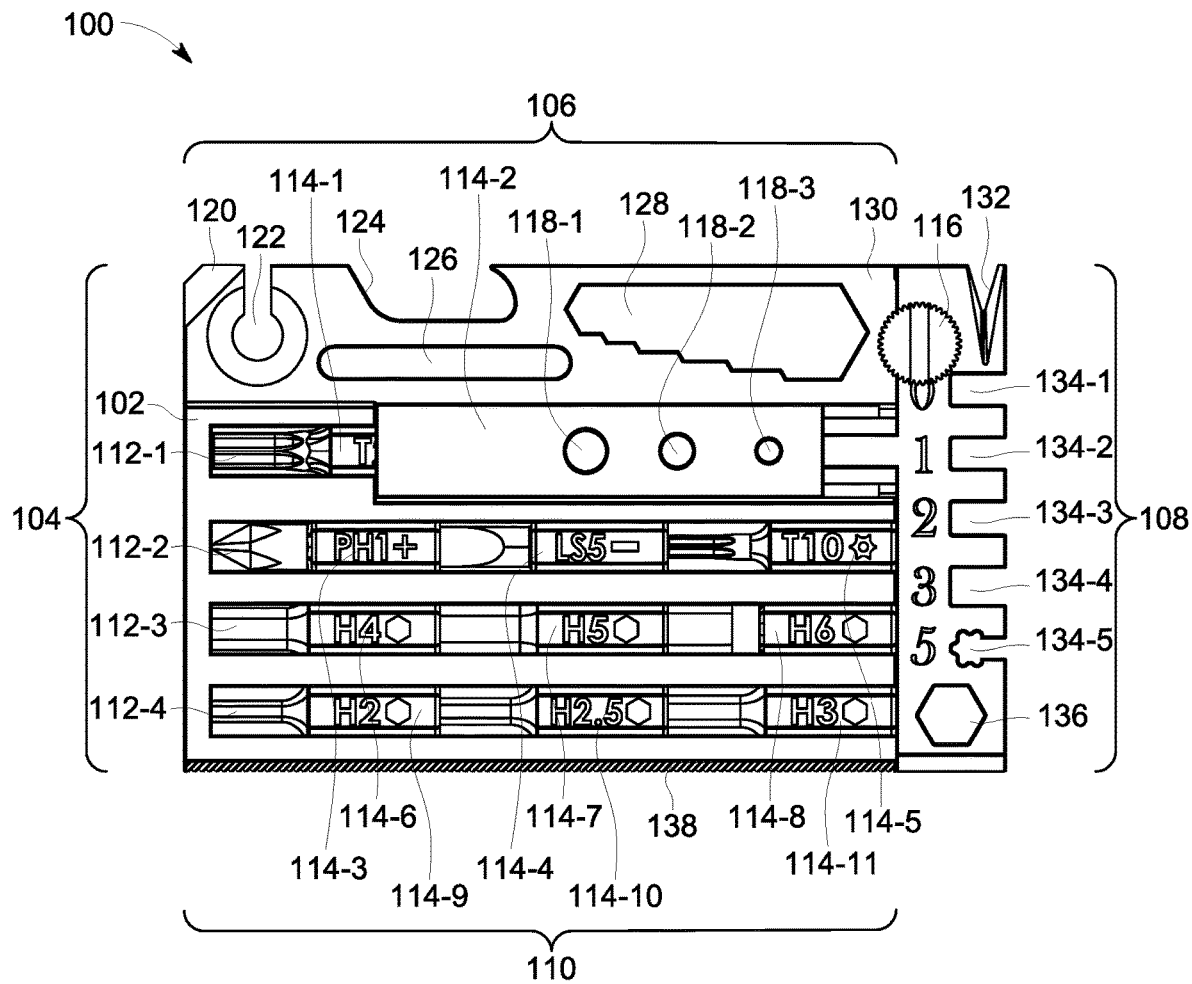
FIG. 3 illustrates the proposed flat all-in-one tool and holder, in accordance with an exemplary embodiment of the present disclosure.

FIG. 3 illustrates the proposed flat all-in-one tool and holder, in accordance with an exemplary embodiment of the present disclosure.

Figure 4:
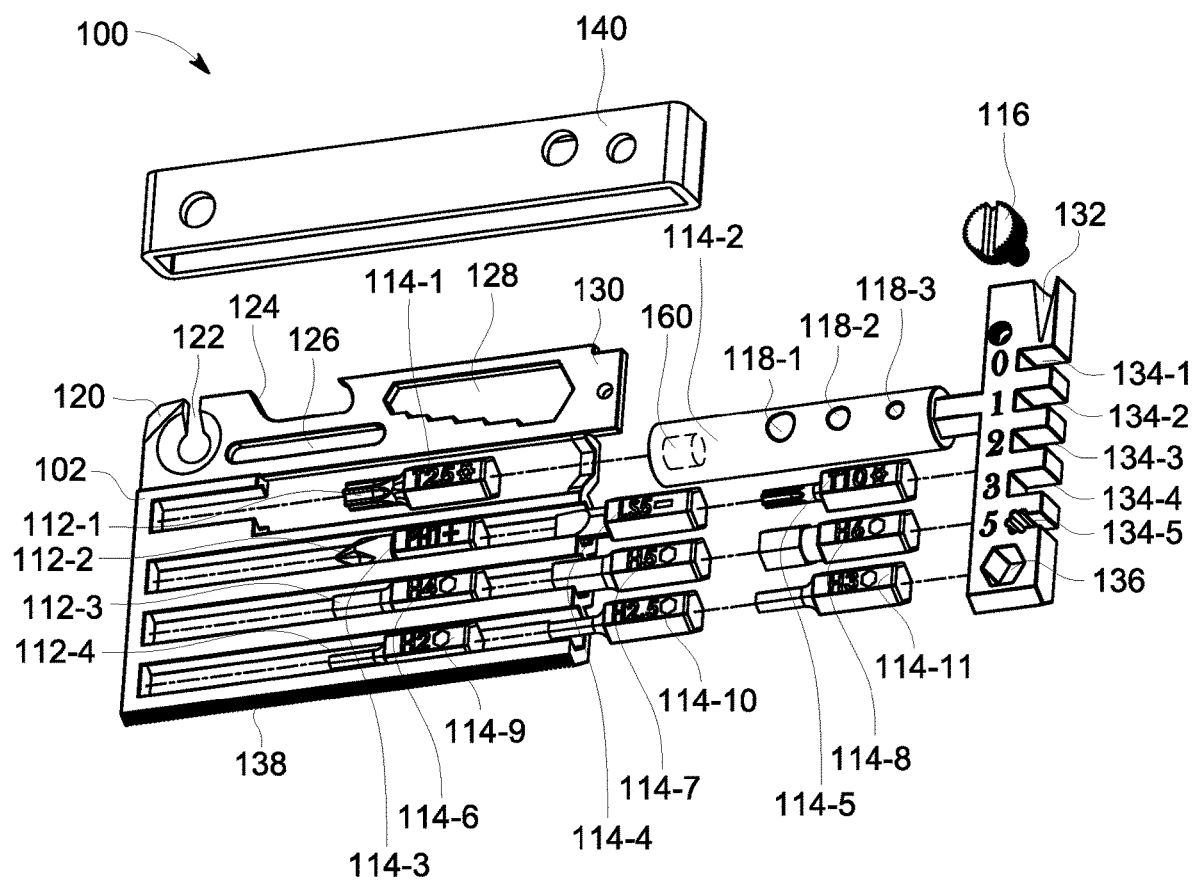
FIGS. 4-5 illustrate an exploded perspective view of the flat all-in-one tool and holder, in accordance with an exemplary embodiment of the present disclosure.
Figure 5:
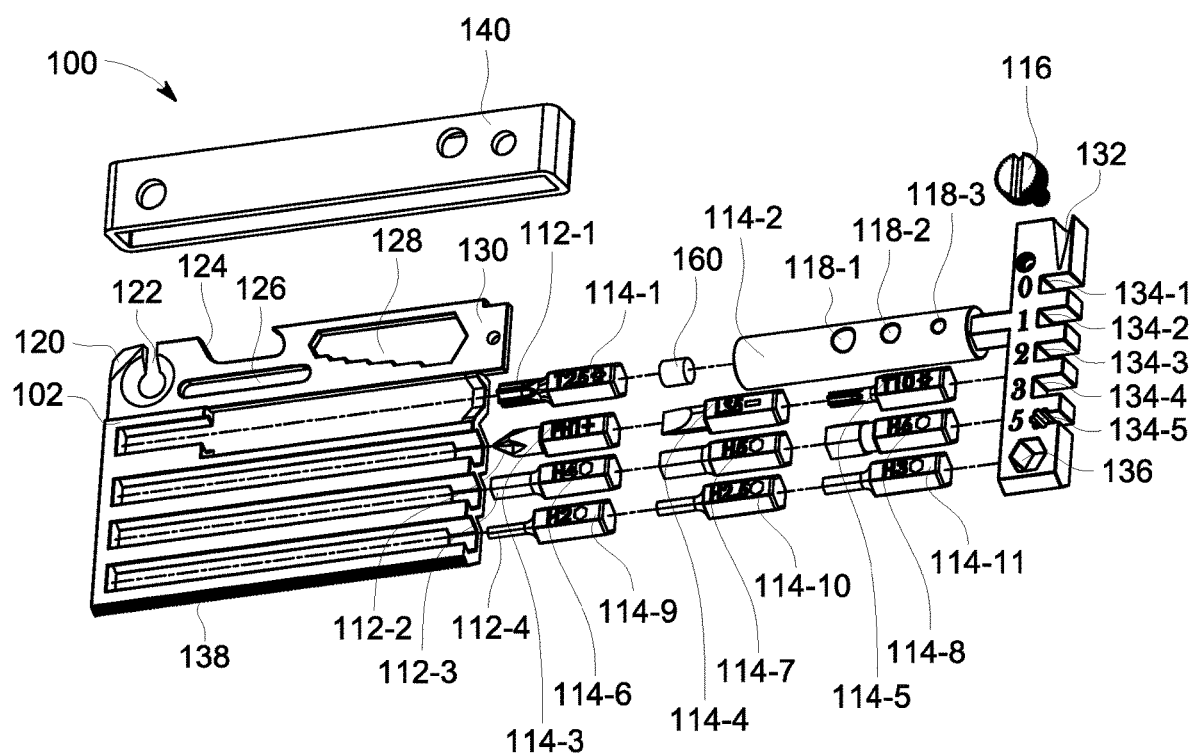

FIGS. 4-5 illustrate an exploded perspective view of the flat all-in-one tool and holder, in accordance with an exemplary embodiment of the present disclosure.

Figure 6:
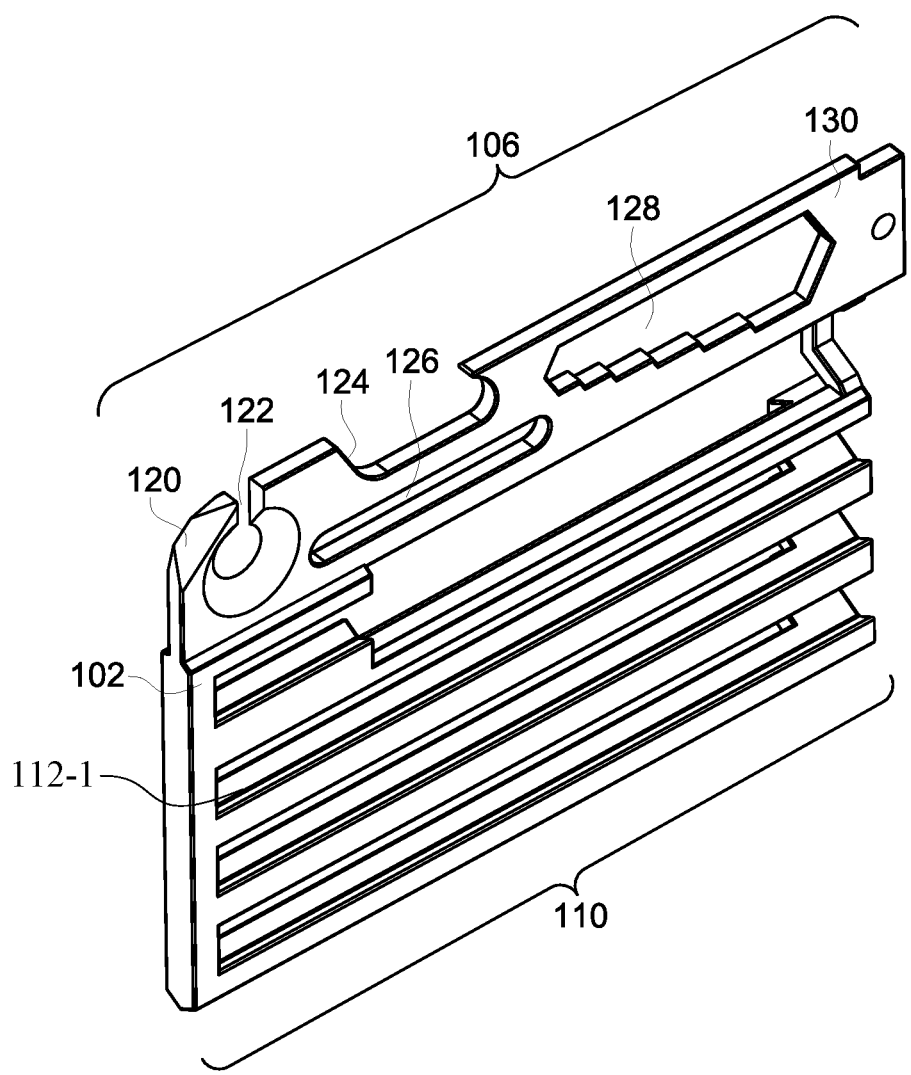
FIG. 6 illustrates an empty flat all-in-one tool and holder without cover, in accordance with an exemplary embodiment of the present disclosure.

FIG. 6 illustrates an empty flat all-in-one tool and holder without cover, in accordance with an exemplary embodiment of the present disclosure.

Figure 7:
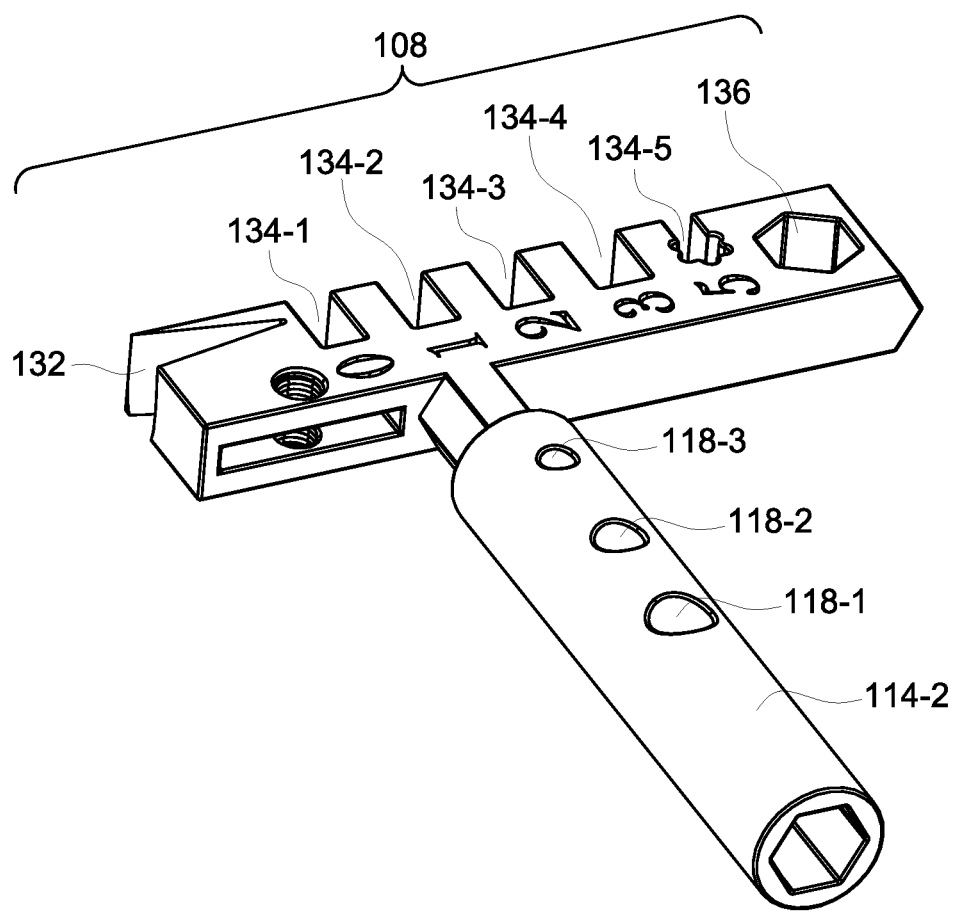
FIG. 7 illustrates a screw bit holder of the flat all-in-one tool and holder, in accordance with an exemplary embodiment of the present disclosure
Figure 8:
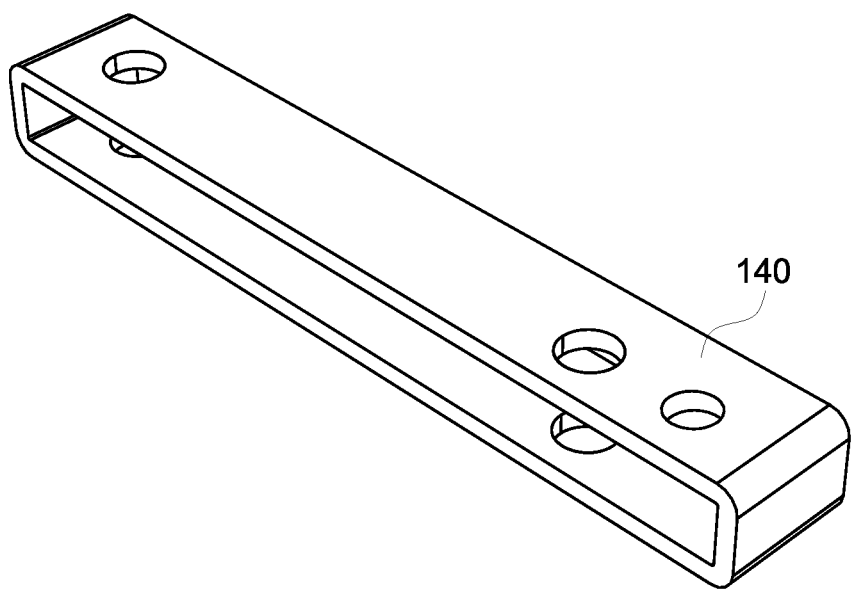
FIG. 8 illustrates a cover for the flat all-in-one tool and holder, in accordance with an exemplary embodiment of the present disclosure.

FIG. 7 illustrates a screw bit holder of the flat all-in-one tool and holder, in accordance with an exemplary embodiment of the present disclosure FIG. 8 illustrates a cover for the flat all-in-one tool and holder, in accordance with an exemplary embodiment of the present disclosure.

In an embodiment, the present disclosure provides a robust, durable, waterproof flat all-in-one tool and holder 100 having not only compartments for a number of removable or deployable tools such as but not limited to a Phillips Power/Driving Bits 114-3, and Flathead Power/Driving Bits or Slotted Power/Driving Bits 114-4, Torx Power/Driving Bits 114-5, Hex Power/Driving Bits 114-6, 114-7, 114-8, 114-9, 114-10, 114-11, or the like, but also one or more edges is carved to have at least a box cutter 120, a string cutter 122, a bottle opener 124, a wingnut tool 126, a plurality of metric wrench set of different sizes 128, a paint can opener 130, a threaded locking screw 116, a wire striper 132, a plurality of Spoke wrenches (SW) of different sizes 134-1, 134-2, 134-3, 134-4 and Swiss T-20 Torn nipple wrench 134-5, and a Hex Bits socket 136, and at least a file tool 138. These and other objects are attained by a combination wallet tool 100 as described below.

The present invention provides a flat all-in-one tool and holder 100 designed to satisfy the aforementioned need. The flat all-in-one tool and holder of the present invention has the configuration of a payment card which conveniently fits into a users pocket, purse, or wallet, occupying only minimal space and stores multiple everyday or commonly-used tools in an organized fashion. People are accustomed to carrying payment cards, so configuring the tool holder of the present invention to resemble a payment card will attract user interest. Further, the construction of the tool holder is very simple making the tool holder very inexpensive to manufacture.

The invention provides all in one multi-tool functionality integrated into a flat all-in-one tool and holder 100. The flat all-in-one tool and holder 100 allows users to incorporate various sets of tools, implements, and attachments in a portable, compact, and waterproof case.

An aspect of the present disclosure relates to a flat all-in-one tool and holder 100 having a flat card-like body 102 with an interior and a plurality of end edges 104, 106, 108, 110. The flat card-like body 102 encloses a plurality of separate channels 112-1, 112-2, 112-3, 112-4 in the interior, wherein the channels 112-1, 112-2, 112-3, 112-4 being shaped to match a profile of a given one of a plurality of different tools to be held in the channels 112-1, 112-2, 112-3, 112-4 of the body 102. The detachable edge 108 of the plurality of end edges 104, 106, 108, 110 is detachable to allow removal of the plurality of different tools from an open end upon detachment, and one or more edges from the plurality of end edges are carved with at least one mechanical tool.

In an aspect, the channels are basically the canals to hold the tool bit into the structure and prevent it from falling.

In an aspect, the flat all-in-one tool and holder 100 includes a locking mechanism 116 to protect the plurality of different tools to fall-through. In another aspect, locking mechanism 116 is a threaded locking screw.

In an aspect, the locking screw 116 is a magnetic screw which prevents the screw from getting lost by fixing/staying connected to the tool or to the handle during the operations of the tool.

In an aspect, the plurality of different tools comprises any or combination of a Phillips Power/Driving Bits 114-3, and Flathead Power/Driving Bits or Slotted Power/Driving Bits 114-4, Torx Power/Driving Bits 114-5, Hex Power/Driving Bits 114-6, 114-7, 114-8, 114-9, 114-10, 114-11. In another aspect, the plurality of different tools comprises screw bit holder 114-2 having an embedded magnet and carved with one or more wire benders of different sizes 118-1, 118-2 and 118-3.

In an aspect, each of the separate channels being open at one of the end edges of the body upon detachment of the detachable edge 108.

In an aspect, a first edge 106 of the one or more edges 104, 106, 108, 110 is carved to have at least a box cutter 120, a string cutter 122, a bottle opener 124, a wingnut tool 126, a plurality of metric wrench set of different sizes 128, and a paint can opener 130.

In an aspect, a second edge 108 of the one or more edges is carved to have at least a threaded locking screw 116, a wire striper 132, a plurality of Spoke wrenches (SW) of different sizes 134-1, 134-2, 134-3, 134-4 and Swiss T-20 Torn nipple wrench 134-5, and a Hex Bits socket 136.

In an aspect, a third edge 110 of the one or more edges 104, 106, 108, 110 is carved to have at least a file tool 138.

In an aspect, a fourth edge 104 of the one or more edges 104, 106, 108, 110 is opposite to the detachable edge 108 of the plurality of end edges 104, 106, 108, 110, wherein the fourth edge 104 is carved to have a flat surface as a restriction to the plurality of different tools allowing removal of the plurality of different tools from the open end upon detachment of the detachable edge 108.

In an aspect, the flat all-in-one tool and holder 100 includes a cover 140 to envelop first edge 106 of said one or more edges thereby covering sharp edges of at least at least a box cutter 120, a string cutter 122, a bottle opener 124, a wingnut tool 126, a plurality of metric wrench set of different sizes 128, and a paint can opener 130. In another aspect, the at least a box cutter 120, a string cutter 122, a bottle opener 124, a wingnut tool 126, a plurality of metric wrench set of different sizes 128, and a paint can opener 130 are accessible only in open position of the cover 140.

In an aspect, the cover 140 is manufactured from any or combination of a rubber, a plastic and any flexible material. In another aspect, the cover further comprises one or more holes to allow hanging of said cover 140 using carabiner. The holes in the cover allow hanging to bag, belt and pocket using carabiner.

In an aspect, the cover 140 and/or the locking screw 116 provides locking mechanism which hold different tools together in closed position.

Accordingly, the present invention provides a flat all-in-one tool and holder which comprises: (a) a generally flat card-like substrate having an interior and a pair of opposite end edges; and (b) means defining a plurality of separate pockets in the interior of the substrate. Each pocket is open at one of the opposite end edges of the substrate. Further, each pocket is shaped to match a profile of a given one of a plurality of different tools.

More particularly, the flat card-like substrate can be formed by front, rear and middle layers being laminated together in a sandwiched facing relationship with one another. The front and rear layers of the substrate are substantially solid layers. The middle layer of the substrate has a plurality of separate cutouts defined therein. Each of the cutouts is shaped to match a profile of a given one of a plurality of different tools. When the three layers are sealed or laminated together, these voids or cutouts define pockets in the holder for receiving the various tools. Alternatively, the middle and front layers or the middle and rear layers can be fabricated as one layer and then laminated with the remaining layer or the layers can be molded in one complete unit.

The flat all-in-one tool and holder, generally designated, of the present invention. Basically, the flat all-in-one tool and holder includes a generally flat card-like substrate having a plurality of separate pockets defined in the interior of the substrate. Each of the pockets opens at one of a pair of opposite end edges of the substrate. Also, each pocket is shaped to match a profile of a given one of a plurality of different tools which will be described below.

More particularly, in the illustrated embodiment the flat card-like substrate is formed by a plurality of front, rear and middle layers being laminated together in a sandwiched facing relationship with one another. The front and rear layers of the substrate are substantially solid layers. The middle layer of the substrate is in the form of a template having a plurality of separate cutouts defined therein. In the illustrated embodiment, the layers have substantially the same rectangular configurations; however, other shapes and configurations can be employed.

Each of the cutouts is shaped to match the profile of a given one of the plurality of different tools. When the three layers are sealed or laminated together, these voids or cutouts in conjunction with inner facing surfaces of the solid front and rear layers define the separate pockets in the tool holder for receiving the various tools. Alternatively, the middle and front layers or the middle and rear layers can be fabricated as one layer and then laminated with the remaining layer. The various layers are preferably fabricated from any suitable plastic material by using conventional techniques.

Preferably, the thickness of the middle layer is less than the thickness of each of the tools stored in the pockets to provide a frictional fit there between which deters or prevents the tools from inadvertently falling out of the pockets. The back layer also has enlarged entrance recesses defined therein at the opposite end edges of the substrate to enable the user in gripping the tools with his or her fingers to pull them out of the pockets.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure. The inventive subject matter, therefore, is not to be restricted except in the spirit of the appended claims.

The invention claimed is:

1. A flat all-in-one tool and holder, comprising:
   a flat body having an interior and a plurality of end edges, said flat body enclosing a plurality of separate channels in said interior, wherein said channels being shaped to match a profile of a given one of a plurality of different tools to be held in said channels of said body, wherein said channels arranged in parallel are canals to hold a t-shaped handle and plurality of tool-hits in parallel.
   at least one detachable edge (108) of said plurality of end edges is detachable to allow removal forming the t-shaped handle of said plurality of different tools from an open end upon detachment, and one or more edges from said plurality of end edges are carved with at least one mechanical tool, and
   wherein a cover (140) adapted to cover first edge of said one or more edges thereby covering one side of the t-shaped handle and also covering the opposite side forming a compact piece, wherein said at least a box cutter (120), a string cutter (122), a bottle opener (124), a wingnut tool (126), a plurality of metric wrench set of different sizes (128) and a paint can opener (130) are accessible only in open position of the cover.

2. The flat all-in-one tool and holder of claim 1, wherein the channels provides an additional support to prevent the flat body from bending and splitting.

3. The flat all-in-one tool and holder of claim 1, further comprising: a locking mechanism to protect said plurality of different tools to fall-through and also locking the detachable edge to the tool holder.

4. The flat all-in-one tool and holder of claim 3, wherein said locking mechanism is a magnetic screw.

5. The flat all-in-one tool and holder of claim 1, wherein said plurality of different tools comprises any or combination of a Phillips Power/Driving Bits, a Hex Power/Driving Bits, a Torx Power/Driving Bits, a Slotted Power/Driving Bits, and a Flathead Power/Driving Bits.

6. The flat all-in-one tool and holder of claim 1, wherein the t-shaped handle comprises a screw bit holder having an embedded magnet and carved with one or more wire benders of different sizes.

7. The flat all-in-one tool and holder of claim 1, wherein each of said separate channels being open at one of said end edges of said body upon detachment of said detachable edge (108).

8. The flat all-in-one tool and holder of claim 1, wherein a first edge of said one or more edges is carved to have at least a box cutter (120), a string cutter (122), a bottle opener (124), a wingnut tool (126), a plurality of metric wrench set of different sizes (128) with a cover on top of first edge of said one or more edges.

9. The flat all-in-one tool and holder of claim 1, wherein said cover is manufactured from combination of a rubber, a plastic and any flexible material.

10. The flat all-in-one tool and holder of claim 1, wherein said cover further comprises one or more holes on the ends to allow use with a carabiner for hanging of said cover and a second hole for locking screw.

11. The flat all-in-one tool and holder of claim 1, wherein an edge of said one or more edges is carved to have at least a threaded locking screw (116), a wire striper (132), a plurality of Spoke wrenches (SW) of different sizes (134-1,134-2,134-3, 134-4), a Swiss T20 Torx nipple wrench (134-5) and a Hex Bits socket (136).

12. The flat all-in-one tool and holder of claim 1, wherein an edge of said one or more edges is carved to have at least a file tool.

13. The flat all-in-one tool and holder of claim 1, wherein an edge of said one or more edges is opposite to said detachable edge of said plurality of end edges, wherein said edge is carved to have a flat surface as a restriction to said plurality of different tools allowing removal of said plurality of different tools from said open end upon detachment of said detachable edge.

* * * * *